United States Patent [19]

Allen

[11] 4,283,914
[45] Aug. 18, 1981

[54] SOLAR ENERGY SYSTEM

[76] Inventor: Leonard W. Allen, 1342 Vrain, Denver, Colo. 80204

[21] Appl. No.: 31,015

[22] Filed: Apr. 17, 1979

[51] Int. Cl.³ .............................................. F03G 7/02
[52] U.S. Cl. ......................... 60/641 AC; 60/641 AD; 60/659; 60/665; 126/422; 126/435; 126/437
[58] Field of Search ................. 60/641, 659, 660, 665, 60/667, 650, 682, 641 A, 641 AB, 641 AC, 641 AD; 126/421, 422, 435, 437

[56] References Cited

U.S. PATENT DOCUMENTS

| 3,931,806 | 1/1976 | Hayes | 126/422 |
| 3,986,489 | 10/1976 | Schlesinger | 126/421 |
| 4,054,124 | 10/1977 | Knoos | 126/421 |
| 4,091,622 | 5/1978 | Marchesi | 60/659 X |
| 4,215,553 | 8/1980 | Poirier et al. | 60/659 X |

Primary Examiner—Allen M. Ostrager
Assistant Examiner—Stephen F. Husar
Attorney, Agent, or Firm—Kyle W. Rost

[57] ABSTRACT

Solar collectors are supported for accurate alignment with the sun through all daylight hours, as guided by a tracking system employing a sensor for light level and subordinate sensors for two axis tracking, each of the subordinate sensors having a relatively long and thin band of view parallel to the axis of motion. Special coatings on the heat gathering element of the collector efficiently convert infrared, ultraviolet and, to some extent, gamma and cosmic rays into heat. In a system for generating electricity, collectors feed a heat transfer fluid to a heat transfer manifold where collector and fluid temperatures are monitored to control the rate of fluid flow. The fluid also circulates between the manifold and a plurality of heat storage containers. Heat from the containers is removed by another fluid that circulates through an electrical generating system employing a prime mover powered by the second fluid. During periods of continued generation, the system permits the second fluid to be reheated in only one heat storage container at a time, while the collectors regenerates spent heat storage containers.

7 Claims, 8 Drawing Figures

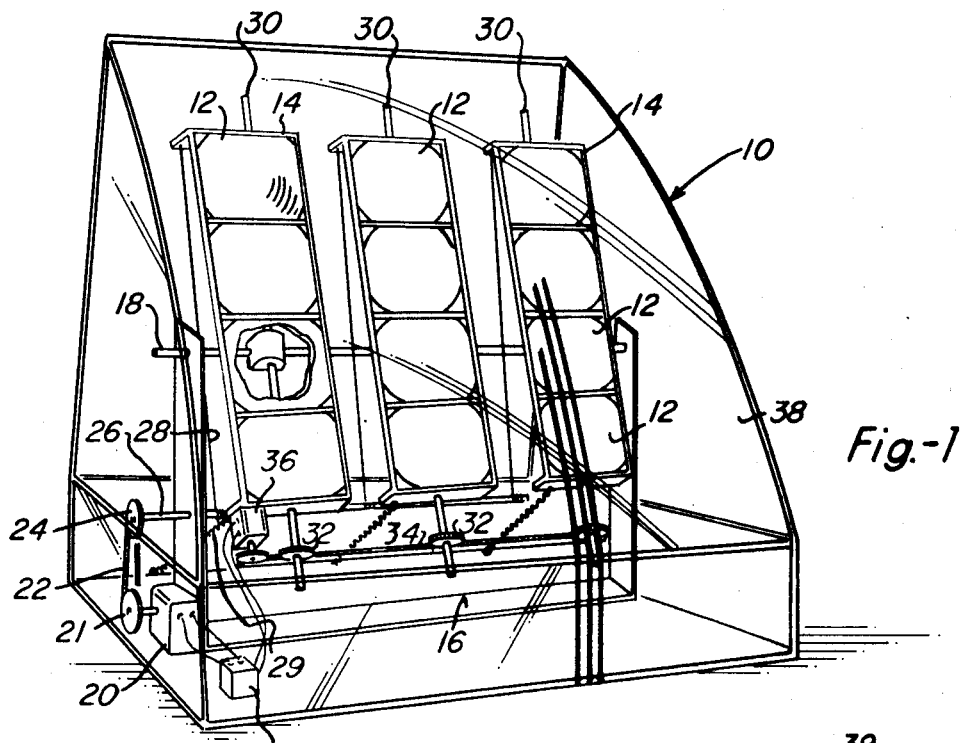
Fig.-1
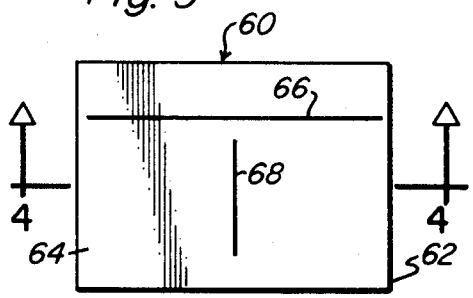
Fig.-3
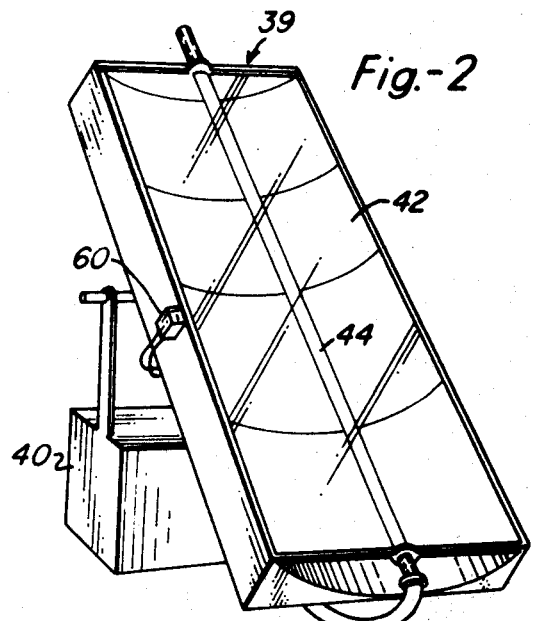
Fig.-2
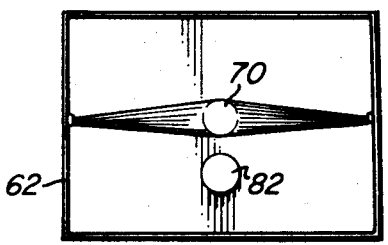
Fig.-4
Fig.-5
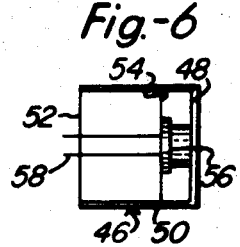
Fig.-6

SOLAR ENERGY SYSTEM

BACKGROUND OF THE INVENTION

1. Field of the Invention

The invention relates to power plants of the kind using solar energy. The invention also relates to stoves and furnaces of the kind energized by solar rays as well as cosmic rays, and gamma rays. Finally, the invention relates to electrical generator structure wherein heat is used to produce pressurized gas or other power generating means.

2. Description of the Prior Art

Solar collectors are known in many forms, with a typical collector having a transparent cover sheet for insulating purposes, a collector plate that is dark in color to receive the ultraviolet rays of the sun and convert them to infrared rays, and a water or air circulation system flowing either over or behind the collector plate to remove the collected heat and carry it to a storage area, where rocks are the most common heat storage medium.

Collectors of the type described are often mounted on the roof or walls of the building to be heated, or alternatively, the collectors may be placed over a large area of ground on fixed frames angling the planar faces of the collector plates approximately toward the sun. The disadvantages of this type of collector are that the heat collecting efficiency is relatively low because the collector is immobile and cannot easily be aimed directly at the sun to operate at maximum efficiency during all sunlight hours and at all seasons of the year. It is desirable for the sun's rays to strike the collector plate perpendicularly, but this occurs for only a short time each day and for only a few weeks of the year. At all other times, the collector operates at reduced efficiency.

Attempts to increase the efficiency of collectors has led to the development of aiming collectors, which track the sun across the sky while maintaining a perpendicular orientation to the solar rays. These collectors have faced certain limitations in the efficiency of their aiming devices, especially when the sun is obscured by clouds. Aiming devices may employ a balanced circuit between two electric eyes that seek equal exposure to the light. One such circuit adjusts the vertical attitude of the collector, while a second such circuit adjusts the horizontal attitude, although other combinations of axes are known. When the horizontal and vertical aiming devices are seeking the position of the sun, they may at times work against each other in that changes in the horizontal position will disrupt the aim of the vertical circuit, and vice versa. For this reason, aiming collectors may lose efficiency.

A number of systems have been proposed to generate electricity from solar heat, which warms a gas that powers a turbine. Because solar heat is available for a limited period of time each day, the efficiency of a solar-electrical generator is critical to the practicality of the system.

The present invention provides a solar collector and aiming device that is highly efficient and adaptable to use in an electrical generating system.

SUMMARY OF THE INVENTION

A solar energy collecting unit employs either flat plate, trough or lens collecting system, with an optical aiming device for maintaining the collecting surface normal to the predominent direction of incoming solar rays. The aiming device employs an infrared activating sensor, and has a single eye for each axis upon which the collector is intended to move, and the eye continuously monitors a relatively broad arc of sky through a relatively narrow band width, resulting in the single eye determining the location of the sun at any position in the monitored arc and maintaining its fix on the sun within the arc despite additional movement of the collector on a perpendicular axis, parallel to the plane of the arc. When the collector is of the lens type, its efficiency is enhanced by provision for a cover over the lens. A suitable collector of the noted types, with or without an aiming device, may be employed in a solar energy system wherein the collector heats a fluid that circulates between the collector and a heat exchange manifold according to monitored parameters such as collector temperature. The fluid also circulates between the heat exchange manifold and a plurality of heat storage containers, each containing a storage media such as eutectic material. Heat gathered in the storage media is removed for use by a circulating gas or liquid, preferably a fluorinated hydrocarbon, that is routed through a hot gas manifold to solar heat utilization equipment. A by-pass from the hot gas manifold permits the fluid to be recirculated to the heat storage containers or to be routed through auxiliary heat sources.

For solar powered generation of electricity, the hot gas manifold leads into a compressor pump powered by a prime mover such as a turbine. The pump directs the hot gas into one of several pressure tanks in accordance with the monitored pressure and temperature of each tank. The gas subsequently passes through a check valve, pressure regulator, and prime mover to power the prime mover. In a completely closed system, the fluid exits the prime mover into a surge tank from which a vacuum pump removes the fluid and directs it to the heat storage containers for reheating. Prior to reaching the heat storage containers, fluid may be subjected to first stage heating through an auxiliary heat source.

A system controller monitors temperatures, pressures, light levels or other parameters associated with efficient system operation and regulates valve openings and closing, pump speeds, and selective utilization of heat storage containers.

Special coatings on the solar collector heat gathering element convert infrared, ultraviolet, and to some extent cosmic and gamma rays into heat.

It is the general object of the invention to create a solar energy collecting system that operates with efficiency and is adaptable to generating electricity in a totally enclosed system with provision for utilizing waste heat sources.

Another object is to provide a tracking system for solar collectors that will rapidly and accurately locate the sun without interference between vertical and horizontal aiming devices and without wasted energy when inadequate sunlight is available.

BRIEF DESCRIPTION OF THE DRAWINGS

FIG. 1 is an isometric view of a lens-type collector.

FIG. 2 is an isometric view of a trough-type collector.

FIG. 3 is a front view of a tracking system, showing the view slots for the tracking eyes.

FIG. 4 is a cross-sectional view through the plane of line 4—4 of FIG. 3, showing the structure of the horizontal detector.

FIG. 5 is a cross-sectional view taken along the plane of line 5—5 of FIG. 4, showing the horizontal and vertical detectors in proper position.

FIG. 6 is a cross-sectional view through the infrared detector.

DESCRIPTION OF THE PREFERRED EMBODIMENT

Figure 7:
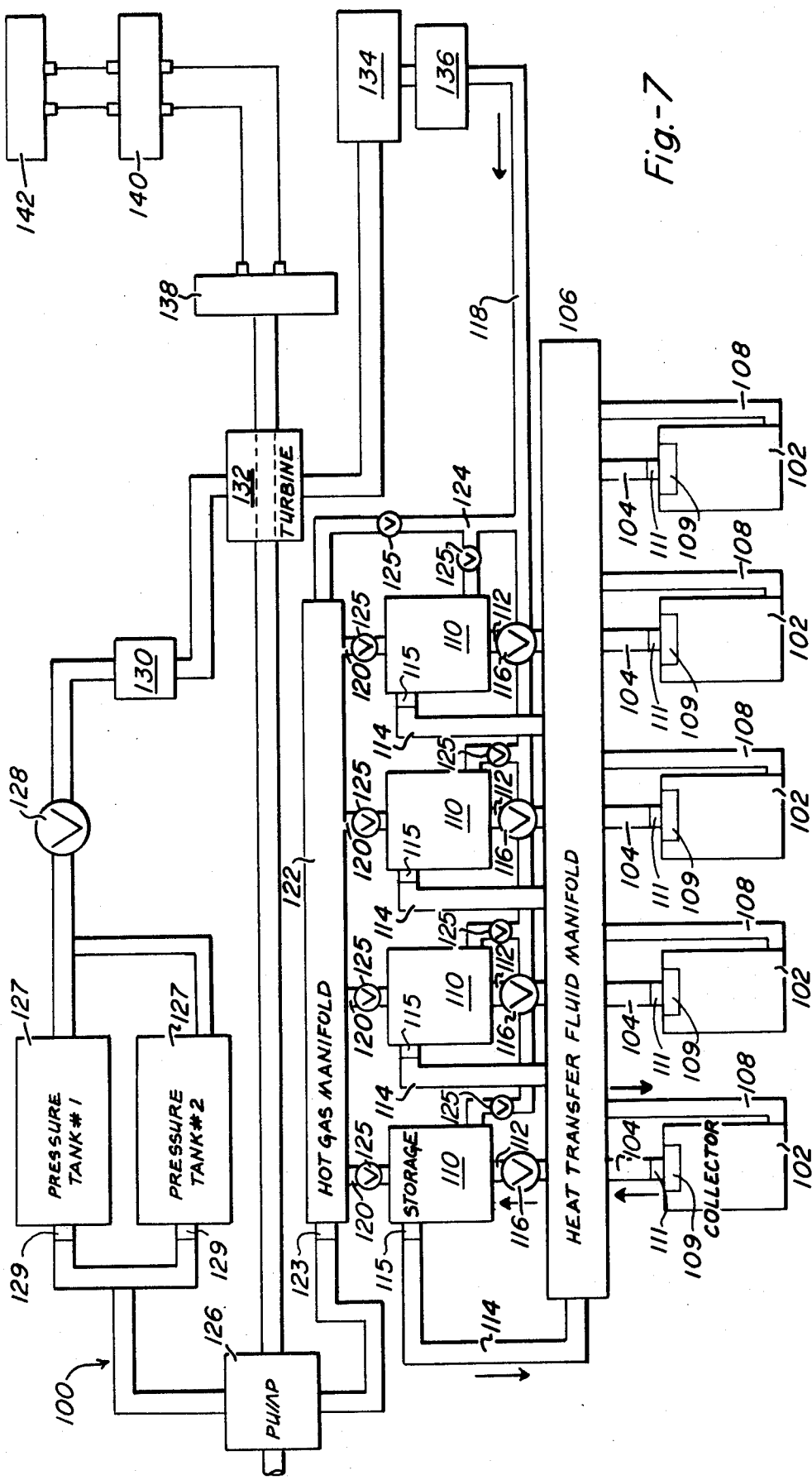
FIG. 7 is a schematic view of an electrical generating system.

The solar energy system encompasses improvements in the solar art both in the construction and operation of collectors and in the construction and operation of solar powered apparatus for generating electricity. Among those types of collectors that are suitable for use in the invention are flat plate, trough, and lens collectors, especially of the type that track the sun on at least one axis to promote efficient operation. The collector is in communication with a heat storage media by means of a circulating fluid. When the collector is employed in a system for generating electricity, the heat storage media warms another fluid that is used to drive a turbine. The efficiency of the collector is enhanced by an accurate aiming device and by provision for gathering cosmic and gamma rays in addition to the normal gathering of infrared and ultraviolet wavelengths.

Collector Design

In FIG. 1 the collector 10 is of the kind employing a plurality of lenses 12, here shown to be joined in vertical banks of four lenses each, each bank being defined by a framework 14 that supports a heating coil (not shown) behind each lens near the focal point of the lens. The coil may be of known types, such as a conical coil of metal tubing having its concave face receiving the itensified light from the lens, and the coil may be encased in an insulating casing. Suitable flexible conduits are joined to the opposite ends of the tubing to permit a heat transfer fluid to circulate through the coil from a reservoir of heat storage media (not shown). The basic operation of the collector 10 is thus intended to gather sunlight from the area covered by the lenses 12 and to concentrate the light energy to produce a high temperature in the heat transfer fluid.

The frameworks 14 are carried on a support base 16 that includes means for pivoting the frameworks on two axes so that the lenses can be aligned with the sun during the available hours of light. The frameworks are thus supported on a first axis defined by the horizontal pivot bar 18, carried on base 16 to permit the frameworks to assume any desired attitude relative to a horizontal plane through the bar 18. The angle may be adjusted by any suitable adjusting means, such as a motor 20 having sprocket wheel 21 on the motor shaft that rotates the pivot bar by means of a roller chain 22 engaging a larger sprocket wheel 24 on one end cable winding shaft 26, which is connected by cable 28 to the top of framework 14. Motor 20 is able to control the attitude of the frameworks 14 with great precision because of the favorable sprocket ratio between the sprockets 21 and 24, and because of the favorable ratio between the large diameter of sprocket 24 as compared to the smaller diameter of shaft 26. Cable is wound or unwound on shaft 26 to tilt the framework, and a resilient means such as spring 29 may oppose the winding action to eliminate all substantial play from the attitude adjustment. The second axis of adjustment is defined by pivot bar 30, which supports the framework for side-to-side angular adjustment, as is required to track the sun across the sky each day. A pinion gear 32 on bar 30 engages a rack 34 that is moved with respect to the pinion gear to cause rotation thereof, in turn rotating the bar 30 to adjust the horizontal angle of the framework 14. A second motor 36 is operatively connected to the rack 34 to move it from side to side as required to properly aim the framework and its contained lenses at the sun.

The entire collector 10 is covered by a domed transparent polycarbonate shield 38 to prevent dirt from covering the lenses and thereby decreasing the efficiency of the collector.

Another collector 39 is shown in FIG. 2 to be of trough design. A support base 40 carries a polished or mirrorized trough 42 having a reflecting surface that reflects light essentially along a single line or narrow band that is occupied by a tubular heat collector 44. A heat transfer fluid circulates through the collecter tube by means of flexible conduits leading to and from a storage media. The trough collector may be mounted on the base 40 to track the sun along one or two axes, by pivot bars similar to those described in connection with collector 10 or by other arrangements.

A third type of collector (not shown) is the conventional flat plate type having a dark colored collecting surface and covered by single, double, or triple layers of glass or clear plastic. The flat plate design is quite similar in appearance to one bank of lenses in collector 10, except that the plate itself gathers the heat, which is carried to the heat storage media by a fluid that circulates in direct contact with the plate, such as through passageways formed in the plate itself. Flat plate collectors may be mounted to track the sun on one or two axes.

The heat gathering element in the previously described solar collectors is usually coated with a black material such as a high temperature paint. It is well known that black materials are efficient in absorbing heat from the infrared range. Cosmic rays and gamma rays are a potential source of additional heat, which would be of benefit even at times when direct sunlight is not available. Certain chemical compounds may be applied as a coating to the heat gathering element of a solar collector, especially to a flat plate collector where the heat gathering element is relatively larger in surface area than in lens or trough collectors. Those chemicals that have been found useful as absorbers of ultraviolet, cosmic, gamma, and other light wavelengths include the metallocenes, which are transition metal complexes with the cyclopentadienyl anion having the general formula $(C_5H_5)_2M$ where M is a metal. Some specific chemicals include ferrocene, dicyclopentadienyl metal halides having the general formula $(C_5H_5)_2MX_{1-3}$ where X is a halide, and monocyclopentadienyl metal compounds having the general formula $C_5H_5MR_{1-3}$ where R is a radical or organic composition. Other absorbers include 1, 2, 3-Benzotriazoles, Uranocene (Bis-cyclootatetraenyl-uranium), phenol-nickel complexes, and, for neutron absorption, cadmium and boron. The likely mechanism by which the above chemicals produce heat is that the wave of electromagnetic radiation excites the chemical from a ground state to an excited electronic state of increased potential energy, after which the chemical molecules return to ground state by emission of heat energy.

With these coatings, the collector has increased efficiency since ultraviolet light reaches the earth even through cloud cover, and cosmic and gamma rays are present at night at almost the same intensity as during the day. Tracking is not required for gathering UV, cosmic and gamma rays since these rays are received in diffused patterns at those times when a strong source of infrared radiation is not present.

With reference to FIGS. 3–6, any of the types of solar collectors noted above may be aimed accurately at the sun along two axes by a tracking system employing two directional sensors and one infrared triggering detector. The infrared detector 46, best shown in FIG. 6, includes an infrared filter 48 covering the face of the detector, a mounting tube 50 defining the sides of the detector body and providing a mounting surface for filter 48, and end cover 52 closing the rear of the tube 50, a cork sheet 54 providing a mounting surface for the I.R. photo cell 56 within the tube, and suitable interconnecting cable 58 to join the cell to the remainder of the tracking system. The I.R. detector is located outside the cover 38 of the lens collector 10 so that heat build up inside the cover does not cause false triggering.

The directional sensor 60 employs two directional detectors, one to control the vertical drive motor 36 and one to control the horizontal drive motor 20. The sensor 60 consists of a light-tight housing 62 having in its face 64 a pair of narrow slits approximately 1/16 inch or less in width, with the relatively longer slit 66 being associated with the horizontal detector and the relatively shorter slit 68 being associated with the vertical detector. The horizontal detector is shown in FIGS. 4 and 5 to have a photo cell 70 carried by a supporting wall 72 in the housing 62, and connected by interconnecting cable 74 to a suitable switch for controlling the horizontal drive motor. Between photo cell 70 and slit 66 are a plurality of plastic optical fibers 76 bound together adjacent to the photo cell into a cylindrical bundle 78 by holder 80 also supported by wall 72, and as the fibers approach slit 66 they are fanned out by clamp 81 until they form a single plane parallel with the slit. This wide band of optic fibers permits the horizontal detector to have a wide view angle through a very narrow band in the direction perpendicular to the wide view. The horizontal detector is thus able to locate the sun while scanning regardless of whether the vertical detector has been accurately aligned with the sun at the same moment. As soon as the bright sunlight strikes the optic fibers, it passes through the fibers to photo cell 70, turning off a suitable switch such as a triac, thereby stopping the horizontal drive motor.

The vertical detector in FIG. 4 is photo cell 82 mounted a substantial distance, such as two inches, behind vertical slit 68, which is perpendicular to horizontal slit 66. Light passing through slit 68 normal to the face 64 of housing 62 will strike vertical photo cell 82, resulting in the cell switching off the vertical drive motor, for example by turning off a triac.

If insufficient light is striking either the vertical or horizontal detector, that detector will cause its associated drive motor to start, moving the collector between the limits of available motion until the collector is again lined up with the sun. However, if there is insufficient light for operation of the collector, this fact will be detected by the infrared detector 46, which will switch off the directional detectors until such time as there is again enough energy to justify operation of the collector. The tracking system is mounted on the collector in any location where the slits 66 and 68 have proper orientation with the axes of the collector, except that, as noted above, the I.R. detector is outside any cover associated with the detector to avoid false readings. If the detector is desired to track the sun on only one axis, the I.R. detector maintains its function of activating or deactivating the directional sensor but only one directional sensor is required.

Electrical Generating System

Collectors of the lens, flat plate, or parabolic trough type as described above may be employed in conjunction with a totally enclosed apparatus for generating electricity from a relatively low temperature heat source, and in addition, the generating operation may be carried out from any number of waste heat sources or from reservoirs of heat that would not ordinarily be considered suitable to power a generating system. Representative heat sources include ocean water, sewer wastes, and pond water, although the range of sources includes gases, liquids and solids. Thus, a solar powered system may gain useful supplemental or primary energy from unconventional sources.

With reference to FIG. 7, the generation system 100 employs a plurality of energy collectors 102, the exact number of collectors depending on system requirements and availability of supplemental heat sources. From each collector 102 a heat transfer fluid picks up the collected heat and circulates by means of conduit 104 into the heat transfer fluid manifold 106, where the fluid may return to the collectors by means of conduits 108. A pump 109 may be associated with each collector or a single pump station may serve the entire manifold 106 to regulate the fluid flow from the collectors, and these pumps are in turn controlled by pressure and temperature controls 111 in the manifold. A plurality of heat storage containers 110 are connected to the manifold 106 by means of a conduit 112 leading into a heat transfer coil in the individual containers, and a return conduit 114 directs the spent fluid back into the manifold for additional heat pick-up. Pressure and temperature controls 115 associated with each heat storage container can regulate the flow through that container from the manifold 106. Suitable valves 116 on conduit 112 permit each storage container to be shut off from the manifold are required. The heat storage containers may be of the two sided type directly passing heat from the transfer fluid across a barrier to a different cold fluid, or the container may hold a storage media such as a chemical or metallic phase change material that receives heat from the transfer fluid and subsequently surrenders the heat to a separately circulating cold fluid. Other acceptable storage media include water and rock, but phase change materials are preferred for their greater efficiency in storage volume, less container cost, and more efficient temperature and pressure control in the operation of the electrical generation system. Each container 110 may employ a different storage media for a different phase change temperature.

On the cold side of the heat storage containers, conduit 118 directs a cold gas into the containers for heat pickup, after which the gas passes through conduit 120 into a hot gas manifold 122. The hot gas manifold contains master pressure and temperature controls 123 that regulate each heat storage container and are capable of overriding other system controls. A by-pass conduit 124 permits return of hot gas to the heat storage containers and provides means for collecting waste heat from any auxiliary source. Valves 125 permit the flow of cold gas to be selectively routed through the cold side of the heat storage containers.

In the normal operation of the electrical generating system, the heated gas from the hot gas manifold is directed to pump 126, which pumps the gas under pressure into one of several pressure tanks 127, each having pressure and temperature controls 129 to regulate which tank receives the gas from the pump. From the tanks, the pressurized gas passes through one-way check valve 128 and pressure regulator 130 prior to entering the prime mover of the system, which may be turbine 132. Output gas from the turbine enters surge tank 134, where vacuum is applied by pump 136. The gas is then routed back to the heat storage containers. The turbine drives a generator or alternator 138 as well as pump 126. Current from the alternator is directed to a converter 140 that produces the desired voltage at power outlet 142.

The fluid employed on the cold side of the heat storage containers should have a vapor pressure of not less than 50 pounds psig at 100 degrees F. and not more than 1,000 pounds psig at 100 degrees F. Some of the materials that are suitable for this purpose are sulphur dioxide, methyl chloride, ammonia, carbon dioxide, methylene chloride, propane, butane, monobromotrifluoromethane, dichloromonofluromethane, monochlorodifluoromethane, monochlorotrifluoromethane, and dichlorodifluoromethane. These gases are capable of producing sufficient pressure to operate the turbine with relatively low temperatures as might be obtained from waste heat sources. The by-pass conduit 124 provides the capability to utilize waste heat as the initial means of warming the gas after it has passed through the turbine. For example, when the generating system is producing electricity to pump irrigation wells, the gas used to power the turbine flows through a portion of conduit 124 submerged in water from the well being pumped to pick up its first stage of heat, which would be approximately 55 to 65 degrees F. The gas then passed through the solar heat storage containers to acquire a second stage of heat.

The method of operation of the system is adapted for long term generation of electricity, and it is for this reason that multiple heat storage containers are employed. At system start-up, the collectors 102 operate to bring all heat storage containers 110 up to full working temperature, after which some containers are taken off-line by closing valves 116 for the desired containers. In typical operation, only one container 110 would remain in immediate active service and all cold gas flow from the turbine would be through that single container until the amount of stored heat can no longer maintain the required output. At that time, valves 125 to the spent container are closed and the next pre-heated container is put on-line, while valves 116 to the spent container are opened so that hot fluid from the heat transfer manifold can reheat the spent container to maximum temperature. This sequence may be repeated through the plurality of heat storage containers so that heat storage and hot gas flow to the prime mover are constantly controlled. The number and size of storage containers 110 are determined by the desired reserve of heat for the specified period of continuous electrical production. By using phase change material as energy storage media and using a different temperature material in the different storage containers, heat storage is quite efficient through a wide range of available heats, since a large amount of heat becomes available when the temperature drops below the phase change temperature of each container.

Solar System Controller

Figure 8:
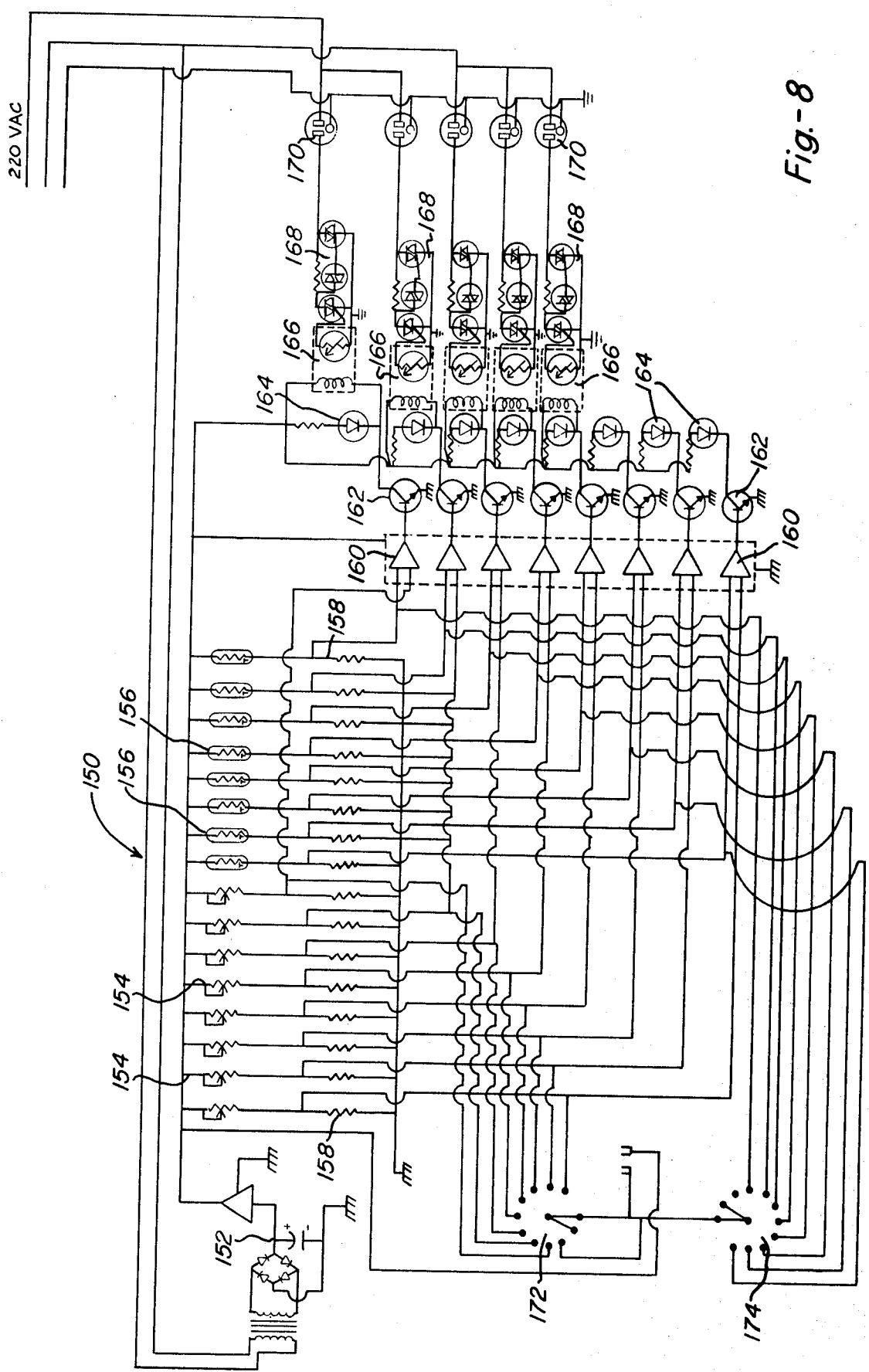
FIG. 8 is a diagram of an electronic controller for the electrical generating system.

An important aspect of the system for generating electricity is that pressures and temperatures must be controlled carefully so that, in a totally enclosed system, pressures do not exceed the capacity of the various components, the cold fluid is thoroughly heated before reaching the prime mover so that the prime mover is not damaged, and temperatures do not exceed the working maximum of the various system components. The system controller 150, best shown in FIG. 8, is a general purpose unit that is adaptable by modification to regulating a variety of system variables.

The system 150 includes a regulated, filtered power supply 152. A plurality of signal inputs are contained in the system, shown for illustrative purposes to include eight variable resistors or potentiometers 154 adjustable to set the level of voltage to be sensed, and eight thermistors 156 to monitor selected temperatures in the generating system. Sixteen voltage dividers 158 are connected to the signal inputs to provide a reference voltage serving as a constant. The signal inputs are connected to eight comparators 160, each of which is connected to a transistor 162 in open collector configuration to serve as an on/off switch in conjunction with its associated comparator. The switching function controls the operation of light emitting diodes 164. At five locations in FIG. 8, the LED's are joined to opto-isolators 166, which in turn are connected to switches 168 consisting of triacs and diacs as shown, to control the availability of electricity in plugs 170. Any desired apparatus may be plugged into plugs 170 to be controlled in accordance with the signal inputs. In operation each thermistor compares its resistance with that of an associated variable resistor. If the resistance matches or is higher, the comparator associated with the thermistor shuts off, but if the thermistor resistance is lower, the comparator opens, directing current through the associated plug. Other aspects of the controller include switch 172 that permits selection of a signal input and its comparator for adjustment of reference voltage level, thereby selecting the desired temperature at which the comparator will open or close. Switch 174 selects the signal inputs for measurement of actual signal voltages.

The controller is employed in the electrical generating system to monitor the operation of the collectors. The temperature of the heat transfer fluid is measured at the inlet and outlet of the collectors. When the temperature at the outlet is above a predetermined temperature, a pump 109 plugged into the appropriate plug 170 is activated to pump heated fluid to the heat exchange manifold. When the outlet temperature is below the set temperature, the pump is turned off. Temperatures are monitored every half cycle, or 120 times per second, providing control over pump speed and thereby controlling the rate of flow and the temperature output of the collectors. The temperature, pressure, and flow rates of liquids and gases in the entire generating system for such purposes as heating, hot water, air conditioning and production of electricity are similarly controlled.

In the heat storage containers, the temperatures at both inlet and outlet of the storage are monitored. The temperature inside the storage container controls a back-up charging system that may be employed in a hot water heating system (not shown). In such a hot water tank, the water temperature controls the operation of a back-up electrical heating element inside the tank to maintain the desired water temperature, but only if the chemical storage media cannot supply the required heat. If the stored heat in the containers is low, the hot water may be used to recharge the heat storage containers, thereby providing a back-up heating system.

Space heating and air conditioning may employ a water-to-air heat pump (not shown). The controller may maintain the water within the desired range, which varies according to the specific heat pump being used, but the typical range may be between 40 and 90 degrees F.

For production of electricity, the controller is adapted to control eight independent devices according to temperature, light, pressure, or flow rate in liquid, gases, or solids, The appropriate control is achieved by employing the required signal input sensor, permitting control by light presence, light level, light color (wavelength), pressure, sound, level, or motion (speed or direction). To achieve the desired control, a thermistor 156 may be replaced by a variable resistor responsive to changes in the desired parameter. Of the eight available channels in the illustrated controller, the first two, for example, may have a signal inverting function so that the device being controlled, such as a pump, heating element, fan, or valve, will turn off with temperature increase above a set level, while the remaining six have no signal inverting function so that the output will turn on with temperature increase above the set level.

The solar system controller can be used in combination with the tracking system previously described by replacing the righthand three thermistors in FIG. 8 with, respectively, the IR photo cell 56 and the two photo cells 70 and 82 for directional detection. Suitable output circuitry may then be connected to the lower three LED's in FIG. 8 so that the IR cell serves as the master on/off switch for the outputs from the two directional cells. In this arrangement, the IR detector is responsive to light wavelength and intensity, while the directional detectors are responsive to intensity only. The vertical and horizontal motors are plugged into the controller.

While the above description of the components and operation of the solar energy system has been specific as to many details, the description should be understood to be offered for purposes of example and not limitation.

I claim:
1. A solar electrical generating system comprising:
   (a) a collector having a solar heat gathering element;
   (b) a plurality of heat storage containers containing a storage media;
   (c) a heat transfer fluid manifold;
   (d) means for circulating a heat transfer fluid between said collector heat gathering element and said heat transfer fluid manifold;
   (e) means for circulating a heat transfer fluid between the heat transfer fluid manifold and each of said heat storage containers;
   (f) a hot gas manifold;
   (g) means for circulating an operating fluid from each heat storage container to the hot gas manifold;
   (h) means for returning operating fluid from the hot gas manifold directly to a heat storage container; and
   (i) a closed cycle electrical generating apparatus receiving operating fluid from the hot gas manifold and returning the fluid to a heat storage container.

2. The solar electrical generating system of claim 1, wherein said closed cycle electrical generating apparatus comprises:
   (a) a pump connected to the hot gas manifold to receive heated operating fluid therefrom;
   (b) a plurality of pressure tanks having means for directing operating fluid from the pump to a selected one of the tanks;
   (c) a prime mover operable by operating fluid pressure connected to the pressure tanks to receive fluid;
   (d) a surge tank connected to the prime mover to receive spent operating fluid;
   (e) a vacuum pump removing operating fluid from the surge tank and directing it to a heat storage container; and
   (f) an electrical generating device powered by said prime mover.

3. The solar electrical generating system of claim 2, further comprising waste heat transfer means connected between said vacuum pump and heat storage container for providing a first stage of heat to said spent fluid.

4. The solar electrical generating system of claim 1, wherein said operating fluid comprises a fluid having a vapor pressure between 50 pounds psig and 1000 pounds psig at 100 degrees F.

5. The solar electric generating system of claim 1, wherein said operating fluid is selected from the group consisting of sulphur dioxide, methyl chloride, ammonia, carbon dioxide, methylene chloride, propane, butane, monobromotrifluoromethane, dichloromonofluromethane, monochlorodifluoromethane, monochlorotrifluoromethane, and dichlorodifluoromethane.

6. The process for operating a solar electrical generating system having a plurality of solar collectors joined to a heat transfer fluid manifold that is connected to a plurality of heat storage containers and having a heat transfer fluid circulatable between the collectors, heat transfer fluid manifold and storage containers, and further having a hot gas manifold connected to the heat storage containers and in operative connection with a pump supplying pressurized operating fluid to a pressure tank, in turn supplying pressurized operating fluid to a prime mover that turns an electrical generating apparatus, the prime mover venting spent operating fluid to a surge tank connected to the heat storage containers, comprising:
   (a) monitoring the outlet temperature of the heat transfer fluid exiting the collectors and operating a pump in response to the temperature to maintain the temperature below a predetermined level by pumping the fluid into the heat transfer manifold
   (b) pumping heat transfer fluid from the heat transfer manifold through the heat storage containers to bring the temperature in the containers to a predetermined maximum;
   (c) monitoring the temperature in the heat storage containers and terminating fluid flow through each container that reaches a predetermined maximum;
   (d) circulating an operating fluid through a first selected one of said heat storage containers to provide hot fluid to the hot gas manifold;
   (e) monitoring the temperature decline in said first selected heat storage container and in response to a predetermined minimum temperature terminating fluid flow through the first selected container;

(f) subsequently circulating an operating fluid through a second selected one of said heat storage containers while restoring flow of heat transfer fluid to said first selected container.

7. The process of claim 6, wherein the hot gas manifold has a by-pass conduit connected to the heat storage containers for returning operating fluid thereto, further comprising monitoring the temperature of operating fluid in the hot gas manifold, and pumping operating fluid from the hot gas manifold through the by-pass in response to a monitored temperature below a predetermined level.

* * * * *